(12) United States Patent
Iyer et al.

(10) Patent No.: US 11,528,856 B2
(45) Date of Patent: Dec. 20, 2022

(54) GRAPPLE POSITIONING SYSTEM AND METHOD FOR A WORK VEHICLE

(71) Applicant: DEERE & COMPANY, Moline, IL (US)

(72) Inventors: Suchitra Iyer, Pune (IN); Ishani Pandit, Pune (IN); Jacob M. Eilders, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 833 days.

(21) Appl. No.: 16/505,880

(22) Filed: Jul. 9, 2019

(65) Prior Publication Data

US 2021/0007295 A1 Jan. 14, 2021

(51) Int. Cl.
| | |
|---|---|
| *A01G 23/00* | (2006.01) |
| *B60P 3/41* | (2006.01) |
| *B66C 1/58* | (2006.01) |
| *B66F 9/20* | (2006.01) |
| *B60W 30/04* | (2006.01) |
| *B60W 10/04* | (2006.01) |
| *B66C 3/16* | (2006.01) |

(52) U.S. Cl.
CPC .............. *A01G 23/006* (2013.01); *B60P 3/41* (2013.01); *B60W 10/04* (2013.01); *B60W 30/04* (2013.01); *B66C 1/585* (2013.01); *B66C 3/16* (2013.01); *B66F 9/20* (2013.01)

(58) Field of Classification Search
CPC ........... B60P 3/41; A01G 23/00; B66C 1/585; G05B 9/00
USPC ......................................... 701/5, 36–38, 50
See application file for complete search history.

(56) References Cited

U.S. PATENT DOCUMENTS

| | | | |
|---|---|---|---|
| 3,527,271 A | 9/1970 | Chateauneuf | |
| 8,430,621 B2 * | 4/2013 | Jantti ....................... | E02F 3/437 414/815 |
| 10,597,846 B2 * | 3/2020 | Zent ........................ | E02F 3/436 |
| 2004/0250908 A1 | 12/2004 | Hicks | |

FOREIGN PATENT DOCUMENTS

CA          2309230 C    6/2005

* cited by examiner

*Primary Examiner* — Ronald P Jarrett
(74) *Attorney, Agent, or Firm* — Taft Stettinius & Hollister LLP; Stephen F. Rost (57) ABSTRACT

A system and method of positioning a grapple of a skidder based on ground conditions and felled timber characteristics, or other material characteristics, such as conduit characteristics for pipe, being moved by the skidder. The vehicle includes a level sensor to determine slope of the vehicle based on ground slope and a traction device to determine a slip condition of the vehicle. Level sensors can include a gyroscope, an accelerometer, or a pitch/roll/yaw sensor. The grapple assembly is automatically positioned based on the vehicle slope, the slip condition, and the weight and/or the length of the felled timber being collected by the grapple.

17 Claims, 5 Drawing Sheets

GRAPPLE POSITIONING SYSTEM AND METHOD FOR A WORK VEHICLE

FIELD OF THE DISCLOSURE

The present invention generally relates to a grapple assembly for a work vehicle, and more particularly to a control system and method for automatically adjusting a height of a grapple for a skidder.

BACKGROUND

Work vehicles are configured to perform a wide variety of tasks including agricultural vehicles, construction vehicles, forestry vehicles, lawn maintenance vehicles, as well as on-road vehicles such as those used to plow snow, spread salt, or vehicles with towing capability. Many if not all of these work vehicles include a work implement configured to move, cut and/or break debris, aggregates, vegetation, and other materials.

Movement of the work implement is typically controlled by an operator using hand operated control devices to perform a desired task. In different types of work vehicles, movement of the work implement is controlled by hydraulic valves to direct pressurized hydraulic fluid to various hydraulic actuators on the work vehicle to move the implement.

Forestry vehicles include tree feller bunchers and skidders. A feller buncher cuts trees from a woods or forest and places the trees in bunches on the ground. Some feller bunchers include a felling head with a cutting device for cutting the trees and an accumulation pocket for receiving and holding one or more felled trees until the felled trees are placed in bunches on the ground. Once the trees are cut and located on the ground, the felled trees are moved by the skidder using a work implement known as a grapple. The grapple includes two jaws that open and close to grasp the felled trees and to move the trees from one location to another. After the felled trees are collected and grasped by the grapple, the skidder moves forward pulling the felled trees along the ground. One end of the group of felled trees is elevated above the ground using an arch and boom assembly and the trailing edge is pulled, or skids, along the ground. While skidding the trees along the forest floor is the preferred method of moving the felled trees from the forest to a collection area, skidding the felled trees along the forest floor present an number inefficiencies.

In a known system, the operator has to manually adjust the grapple height along the entire travel distance from the forest area to the collection area, also known as a landing site. Also, every time logs are moved to the landing site, before moving back to forest, the operator must close the grapple and adjust an arch and a boom to a travel position for travelling without a load. This involves multiple position adjustments using joysticks and grapple open-close buttons. This is a very tedious and time consuming task for the operator and causes operator fatigue. Adjustments made by an operator can also be less than accurate and consequently abuse to the ecosystem, damage the logs, and compact the soil all of which should be avoided. It also reduces the fuel efficiency, and increases the time taken to transport the load. What is needed therefore is a system and method to reduce operator fatigue, improve fuel efficiency of the work vehicle, and reduce the time taken to transport the load.

SUMMARY

In one embodiment, there is provided a work vehicle for moving felled trees along the ground that are cut from a worksite during a logging operation. The work vehicle includes a vehicle frame supported by a ground engaging traction device and a level sensor to provide a level output. The level sensor is operatively connected to the vehicle frame to determine the slope of the vehicle with respect to the force of gravity. A grapple assembly is mounted to the vehicle frame and includes a grapple to grasp the felled trees. A controller is operatively connected to the level sensor and to the grapple assembly. The controller includes a processor and a memory, wherein the memory has a plurality of program instructions stored thereon, that in response to execution of the plurality of program instructions by the processor causes the controller to: i) identify a slope of the vehicle with respect to the force of gravity based on the level output; and ii) actuate the grapple assembly to adjust a height of the grapple with respect to ground based on the identified slope.

In another embodiment, there is provided a control system for moving felled trees that are cut from a worksite during a logging operation with a work vehicle having a vehicle frame supported by a ground engaging traction device and a grapple assembly mounted to the vehicle frame, wherein the grapple assembly includes a grapple to grasp the felled trees. The control system includes a level sensor to provide a level output, wherein the level sensor is operatively connected to the vehicle frame to determine the slope of the vehicle with respect to the force of gravity. A controller is operatively connected to the level sensor and to the grapple assembly. The controller includes a processer and a memory, wherein the memory has a plurality of program instructions stored thereon, that in response to execution of the plurality of program instructions by the processor causes the controller to: i) identify a slope of the vehicle with respect to the force of gravity based on the level output; and ii) actuate the grapple assembly to adjust a height of the grapple with respect to ground based on the identified slope.

In further embodiment of the present disclosure, there is provided a method of adjusting a height of a grapple with respect to ground using a grapple assembly supported by a vehicle having a ground engaging traction device, wherein the grapple grasps felled trees that are cut from a worksite during a logging operation. The method includes: i) identifying a slope of the vehicle with respect to the force of gravity; and ii) actuating the grapple assembly to adjust a height of the grapple based on the identified slope of the vehicle.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in combination with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

Figure 1:
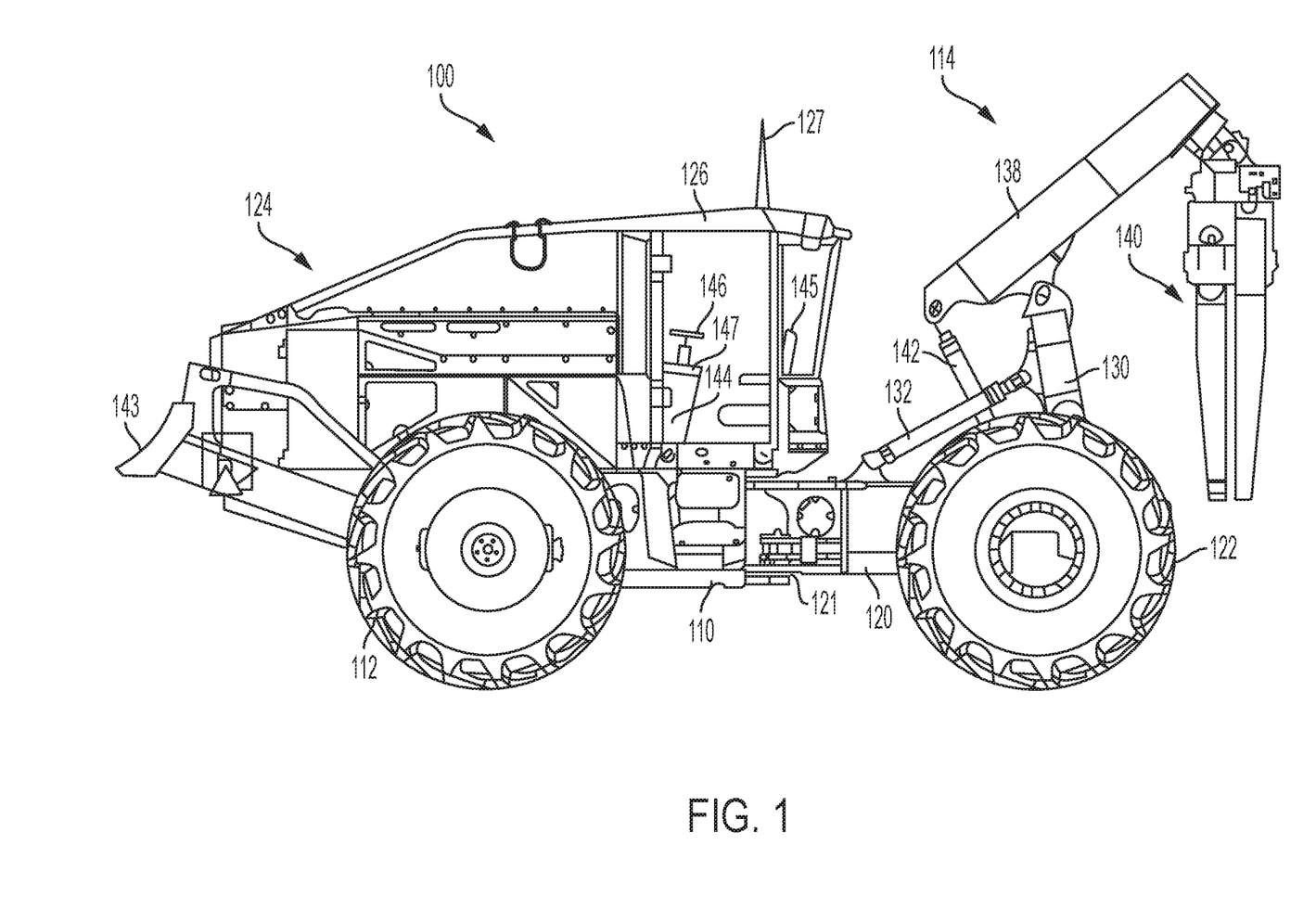
FIG. 1 illustrates a work machine having a grapple.

FIG. 1 illustrates one example of a work machine, a skidder 100, having a pressure hydraulic system to grasp felled trees or logs. The present disclosure is not limited, however, to skidders, but is also intended to include other work machines used in construction, forestry, agriculture and other industries having a hydraulic system to collect felled trees, or to grasp poles, pipe or other conduit. As such, while the figures and forthcoming description may relate to a wheeled skidder, it is to be understood that the scope of the present disclosure extends beyond a wheeled skidder, and the term "machine" or "work machine" will also be used. The term "machine" or "work machine" is intended to be broader and encompass other vehicles besides a skidder. Skidders having tracks are also contemplated. The term "wheels" as used herein is also considered to include "tracks".

The machine 100 includes a front vehicle frame 110 coupled to a rear vehicle frame 120 at an articulation joint 121. The articulation joint 121 defines an articulation axis about which the rear frame 120 rotates about the front frame 110. Front wheels 112 support the front vehicle frame 110, and the front vehicle frame 110 supports an engine compartment 124 and an operator cab 126. Rear wheels 122 support the rear vehicle frame 120, and the rear vehicle frame 120 supports a grapple assembly 114. The engine compartment 124 houses a vehicle engine or motor, such as a diesel engine which provides the motive power for driving the front and rear wheels 112, 122, and for operating the other components associated with the machine 100. The operator cab 126, where an operator sits when operating the machine 100, includes a plurality of controls (e.g., joysticks, pedals, buttons, etc.) for controlling the machine 100 during operation thereof. An antenna 127 is supported by the cab and receives and transits electronic signals including global positioning system (GPS) signals and data transmitted through the GPS system, through a global system for global communications (GSM) antenna, or via wireless transmission systems, including the use of radio waves of different wavelengths. While the antenna 127 shows an antenna as receiving and or transmitting both GPS signals and GSM signals, two or more antennas to accomplish GPS, GSM, and other communication functions are contemplated.

As shown in FIG. 1, the grapple assembly 114 includes an arch section 130, a boom section 138, and a grapple 140. A proximal end of the arch section 130 is pivotably coupled to the rear vehicle frame 120 and a distal end of the arch section 130 is pivotably coupled to the boom section 138. One or more arch hydraulic cylinders 132 are controllable by the operator to move the arch 130. A proximal end of the boom section 138 is pivotably coupled to the arch section 130 and a distal end of the boom section 138 is pivotably coupled to the grapple 140. One or more boom hydraulic cylinders 142 are coupled to the proximal end of the boom section 138 and are controllable by the operator to move the boom 138. A proximal end of the grapple 140 is coupled to the distal end of the boom section 138. A blade 143 is operatively connected to the front vehicle frame 110 and is adjustable with respect to the front frame 110 to move vegetation, debris, soil, rock and other structures from the path of the skidder 100 as it moves forward.

A control pedestal 144 is located in the cab adjacent to an operator seat 145 and supports a steering wheel 146 and a user interface 147. Additional vehicle control devices, located at the control pedestal 144, include a throttle, one or more toggles, control buttons or actuators, and a display to display information and to receive user inputs from the operator. Control devices, in different embodiments, are also located on the arms of the seat 145.

Figure 2:
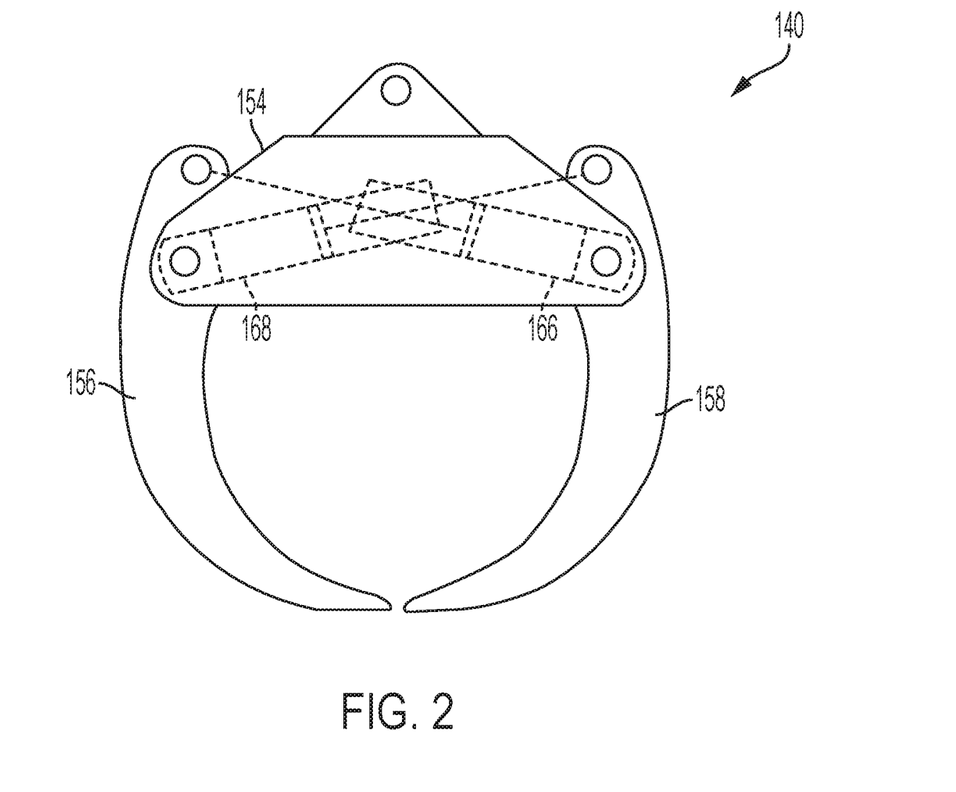
FIG. 2 illustrates an exemplary embodiment of a grapple.

An exemplary embodiment of a grapple 140 is shown in FIG. 2. The grapple 140 includes a base 154 left and right tongs 156, 158, and left and right hydraulic cylinders 166, 168. The base 154 is coupled to the distal end of the boom section 138. The proximal ends of the left and right tongs 156, 158 are coupled to the base 154, and the distal ends of the left and right tongs 156, 158 are controllable by the left and right hydraulic cylinders 166, 168 to open and close the grapple 140. The left hydraulic cylinder 166 has a head end coupled to the base 154, and a piston end coupled to the proximal end of the left tong 156. The right hydraulic cylinder 168 has a head end coupled to the base 154, and a piston end coupled to the proximal end of the right tong 158.

During manual operation of the grapple by an operator, the operator controls extension and retraction of the left and right hydraulic cylinders 166, 168 to open and close the grapple 140. In one embodiment, the operator moves a toggle to open and closed the jaws which are operatively connected to a controller that moves hydraulic fluid through a hydraulic system, as would be understood by one skilled in the art.

When the left and right hydraulic cylinders 166, 168 are retracted, the proximal ends of the left and right tongs 156, 158 are brought closer together, which pulls apart the distal ends of the left and right tongs 156, 158, which opens the grapple 140. When the left and right hydraulic cylinders 166, 168 are extended, the proximal ends of the left and right tongs 156, 158 are pushed apart, which brings together the distal ends of the left and right tongs 156, 158, which closes the grapple 140. Thus in this embodiment, the operator retracts the left and right tong cylinders 166, 168 to open the grapple 140 to surround a payload (e.g. trees or other woody vegetation), and then extends the left and right tong cylinders 166, 168 to close the grapple 140 to grab, hold and lift the payload so the machine 100 can move it to another desired location.

Figure 3:
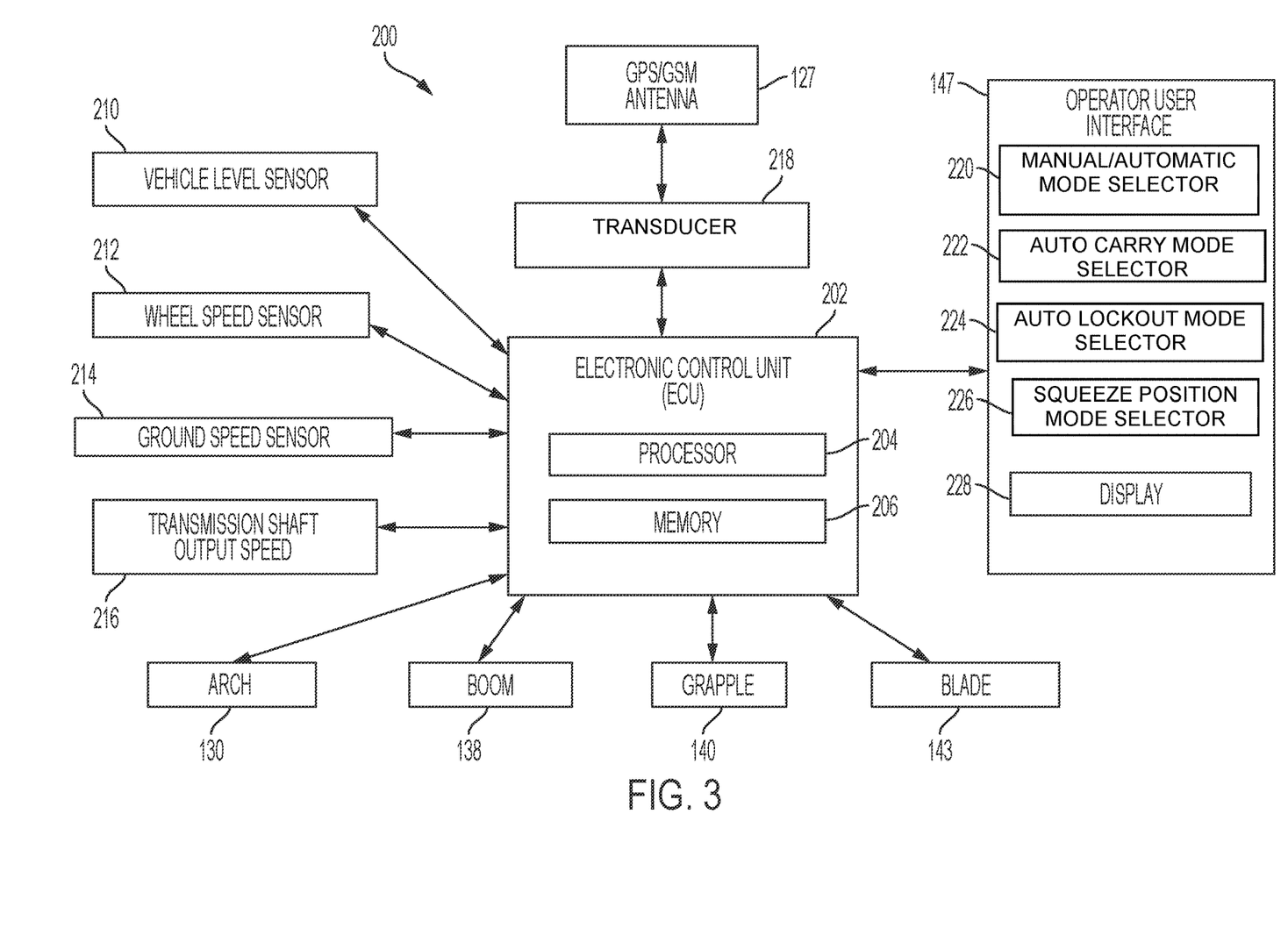
FIG. 3 is a block diagram of a grapple positioning system.

FIG. 3 illustrates a block diagram of a grapple positioning system 200 to adjust the position of the grapple 140, the arch 130, the boom 138, and the blade 143, with respect to the vehicle 100 based on either manual commands, automatic commands, or a combination of manual and automatic position command information. The grapple positioning system 200 includes one or more electronic control units (ECU) 202 each of which is connected to a controller area network (CAN) bus (not shown), but represented in FIG. 3 as double arrow lines indicating a communication link over the bus to and from one or more ECUs 202 and to the various devices and components of the vehicle 100. The CAN bus is configured to transmit electric signals for the control of various devices connected to the bus as well as to transmit status signals that identify the status of the connected devices. In one or more embodiments, a vehicle sensor includes the ECU 202 itself or one of the ECU's connected to any other ECU. Sensor information is received and processed in ECU memory to which it is connected, that is shared with other ECUs over the CAN bus, or other external memory.

The ECU 202, in different embodiments, includes a computer, computer system, or other programmable devices. In other embodiments, the ECU 202 includes one or more processors 204 (e.g. microprocessors), and an associated memory 206, which can be internal to the processor or external to the processor. The memory 206 includes, in different embodiments, random access memory (RAM) devices comprising the memory storage of the ECU 202, as well as any other types of memory, e.g., cache memories, non-volatile or backup memories, programmable memories, or flash memories, and read-only memories. In addition, the memory can include a memory storage physically located elsewhere from the processing devices and can include any cache memory in a processing device, as well as any storage capacity used as a virtual memory, e.g., as stored on a mass storage device or another computer coupled to ECU 202. The mass storage device can include a cache or other dataspace which can include databases. Memory storage, in other embodiments, is located in the "cloud", where the memory is located at a distant location which provides the stored information wirelessly to the ECU 202. When referring to the ECU 202 and the memory 206 in this disclosure other types of controllers and other types of memory are contemplated.

The ECU 202 executes or otherwise relies upon computer software applications, components, programs, objects, modules, or data structures, etc. Software routines resident in the included memory of the ECU 202, or other memory, are executed in response to the signals received from sensors as well as signals received from other ECUs such as an engine ECU and a transmission ECU. The ECU 202 also relies on one or more computer software applications, in other embodiments, that are located in the "cloud", where the cloud generally refers to a network having storing data and/or computer software programs accessed through the internet. The executed software includes one or more specific applications, components, programs, objects, modules or sequences of instructions typically referred to as "program code". The program code includes one or more instructions located in memory and other storage devices which execute the instructions which are resident in memory, which are responsive to other instructions generated by the system, or which are provided a user interface operated by the user.

The vehicle 100 includes a plurality of sensors, each of which in different embodiments, identifies vehicle device status and transmits sensor information to the ECU 202, which the ECU 202 executes to adjust the position of the arch 130, the boom 138, the grapple 140, and the blade 143. When moving the arch 130, the ECU 202 adjusts the position of the cylinders 132. The ECU 202 adjusts the position of the cylinders 142 to move the boom 138 and adjusts the position of the cylinders 166 and 168 to adjust the position of the tongs 156 and 158 to open and to close the grapple 140. In addition, the ECU 202 in different embodiments adjusts the position of the blade 143 through cylinders coupled thereto during an auto-lockout mode described herein. Additional features of the auto-lockout mode include disabling the hydraulics and the steering in one or more embodiments.

The ECU 202 generates commands to adjust the position of the arch 130, the boom 138, and the grapple 140 based on sensor information received from one or more of a vehicle level sensor 210, a wheel speed sensor 212, a ground speed sensor 214, and a transmission shaft sensor 216. In one or more embodiments, the level sensor 210 includes a gyroscope, an accelerometer, and a pitch/roll/yaw sensor. Other types of level sensors are contemplated. The ECU 202 is also operatively connected to a receiver and/or transceiver 218 that receives and/or transmits electronic information transmitted by the antenna 127. In one embodiment, the antenna 127 is a GPS antenna.

The ECU 202 is further operatively connected to the operator user interface 147 that includes a manual/automatic mode selector 220. During operation of the vehicle 100, the operator selects one of a manual mode or an automatic mode with the manual/automatic mode selector 220. Upon selection of the manual mode, the skidder operates in a manual mode enabling the operator to manually adjust the position of the grapple by the use of joysticks or buttons located at the control pedestal 144 or at controls provides on the arms of the chair 145. Using these controls, the operator moves the arch along a longitudinal path defined along the length of the rear vehicle frame 120. The grapple 140 is raised or lowered with respect to the ground using the boom 138. The grapple 140 is opened or closed with the grapple control 140.

While manual control by the operator is generally satisfactory when the skidder moves along flat ground, the operator must consider how high to elevate the grapple above the ground, since the height of the grapple determines how the felled trees are carried along a path or road. For instance, if the grapple is positioned too low during travel, efficiency is lost due to frictional losses resulting from more contact area between logs and the ground surface. Since there is more friction, more power is needed by the skidder to move forward, which means more fuel consumed. If frictional losses are high and the grapple is not adjusted accordingly, additional time to move the felled trees from one location to another location may be required due to the increased friction. If, however, the grapple is held high, which means lesser frictional losses, the vehicle can move at a higher speed with the same power, less fuel is consumed, and the time to move from one location to another location can be reduced. Consequently, the height at which the grapple is positioned when skidding felled timber impacts productivity.

In addition to grapple height affecting productivity, grapple height can affect stability of the vehicle as the vehicle moves along sloped or uneven terrain as well as muddy ground, where the wheels can slip and lose traction. For instance, if the grapple is held too high, machine stability could be at risk due to the higher center of gravity. If the grapple is held low in these conditions, however, more contact exists between the felled timber and the ground which provides additional stability. Under these conditions, the weight of the logs can be used to assist in braking or climbing uphill.

Additional losses to productivity result from what is known as actuation of the "squeeze position". Every time logs are moved to the landing site, before moving back to forest, the skidder operator manually moves the arch, the boom, and the grapple to the squeeze position. In this position, the grapple is closed, the arch is moved toward the cab 126, and the boom is moved to an elevated position above the ground. The squeeze position involves multiple position adjustments using one or more joysticks and buttons.

In order to reduce the loss of productivity and/or to provide additional stability to the vehicle, the user interface includes an auto carry mode selector 222, an auto lockout mode selector 224, and a squeeze position mode selector 226 to select the squeeze position as described herein. When engaged, the auto carry selector 222 automatically positions the grapple based on one or more of ground slope, log weight, log length, and ground conditions such as muddy versus solid ground.

When the lockout selector is engaged, a lockout mode is enabled for machine maintenance. In this mode, the hydraulics are disabled, the grapple 140 is closed, the arch 130 is brought close to cab, and the boom 138 is lowered. The front blade 143 is lowered to a ground position. In addition, the engine is switched off and hence the steering is disabled as well.

In the squeeze position, the grapple 140 is closed, the arch 130 is moved to extend toward the cab 126, and the boom 138 is moved to an elevated position above the ground. The user interface 147 further includes a display 228 to display status information directed to the condition or status of the vehicle 100. Status information includes, but is not limited to, the status of the various selectors, and the positions of the arch 130, the boom 138, the grapple 140 and the blade 143.

Figure 4:
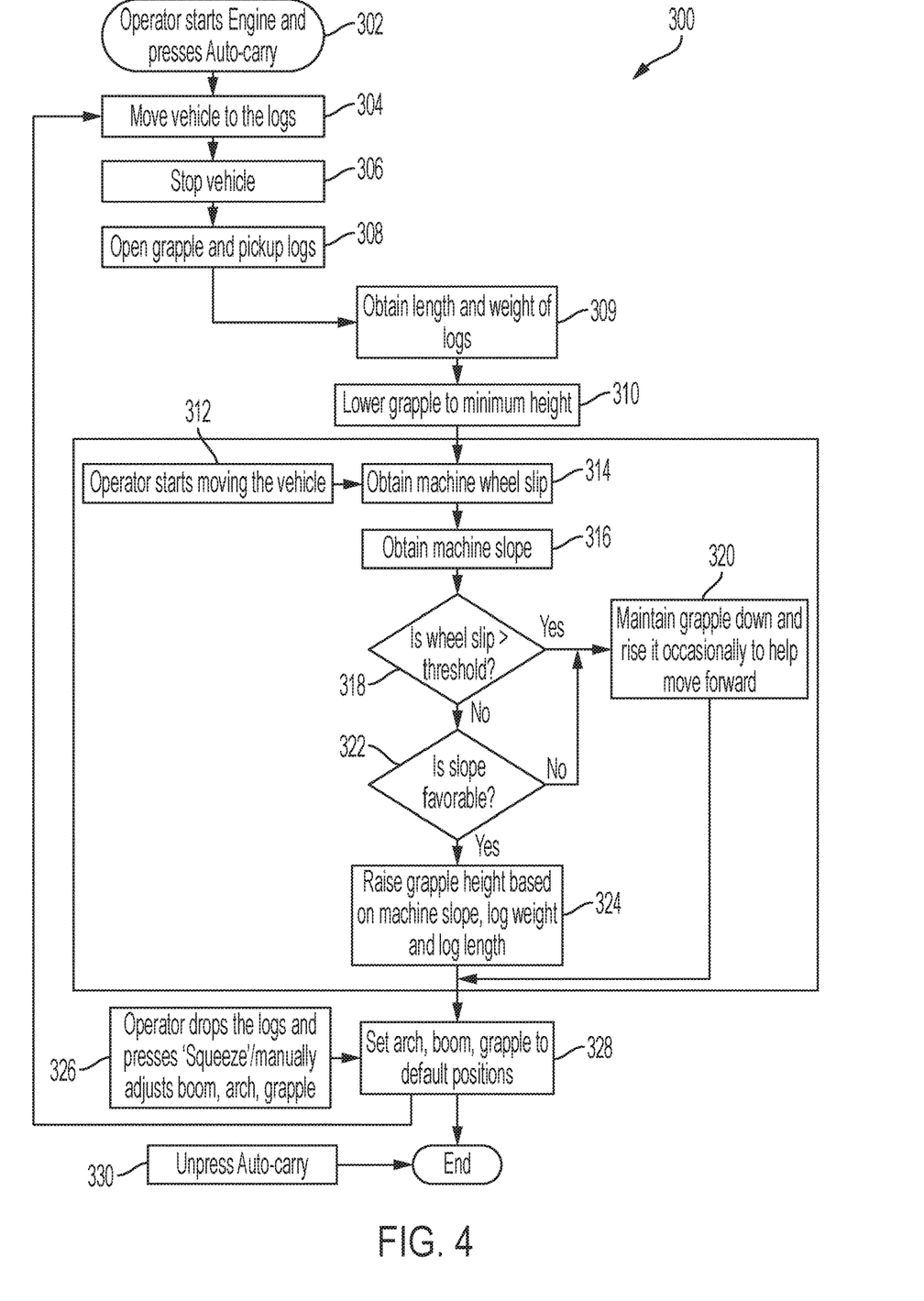
FIG. 4 is a flow diagram of a process to automatically adjust the position of a grapple of a work machine.

FIG. 4 illustrates a flow diagram 300 of a process to automatically adjust the position of the grapple 140 of the vehicle 100. If the auto-carry selector 222 is engaged, the location of grapple 140 is automatically positioned as described in the flow diagram 300. Initially at block 302, the operator starts the engine and the auto-carry selector 222 is engaged, moves the vehicle towards the logs or felled timber at block 304, and stops the vehicle 100 at block 306. At block 308, the operator manually opens the grapple 140, manually moves the grapple 140 to the logs, and closes the grapple 140 to capture the logs for moving to a collection area or to another vehicle for transport of the logs. Once the grapple 140 has been closed by the operator, the controller 202 determines the length of the logs at block 309. Worksite data, including log length information and log weight information in one embodiment, is stored in the memory 206 based on information received from the a global system for mobile communication (GSM) providing cellular connectivity through the antenna 127. In another embodiment, the log characterizing data is stored in the memory 206 based on information received though a manual input device such as a hard drive interface, a thumb drive, or a data disc. Wireless transmission of data, other than by satellite, such as radio transmission, is also contemplated. The felled tree characterizing data is read from the memory 206 and is used in the automatic control of the grapple assembly 114, including control of the arch 130, the boom 138, and the grapple 140. By obtaining information about weight and length of logs, information regarding wood volume, and thus, estimates of the operational efficiency of the machine and the operator are provided.

Worksite data, in one or more embodiments, is stored in a centrally located server or memory, in the vehicle under operation, or in another and different vehicle. The worksite data in different embodiments, is transmitted from a storage location through GSM transmission, cellular transmission, from a server, the cloud, or another machine. For instance, a currently operating vehicles directly transmits the worksite data to a next vehicle where it is stored to enable the processor in the next vehicle to prepare that vehicle's next task.

Once the log characterizing data has been read, the operator moves the grapple assembly 114 to lower the grapple 140 to a minimum height at block 310. In another embodiment, the grapple 140 is moved by machine control in which the processor 204 moves the grapple 140 based on a weight sensor (not shown) in the grapple assembly 114 that determines when the weight of the collected logs has reached a value which does not change with further lowering of the grapple 140.

Once the grapple 140 has been sufficiently lowered, the operator starts moving the vehicle at block 312. Initially, the vehicle is moved while the logs are completely lowered to the ground, a condition that provides a maximum amount of friction between the logs and the ground. As the vehicle is moved in a forward direction, the wheel slip is obtained at block 314. In one embodiment, the wheel slip is measured by comparing the forward movement of the vehicle, i.e. the vehicle speed, with respect to the wheel speed determined by the wheel speed sensor 212. The vehicle speed is measured by the ground speed sensor 214, the transmission shaft output speed 216, or a vehicle speed sensor provided by the GPS signal received at the GPS antenna 127. Other devices measuring wheel speed are contemplated. The slope of the vehicle 100 is obtained at block 316 using the vehicle level sensor 210.

In one embodiment, as the slope of the machine is determined, the value of the slope is displayed on the display 228 of the user interface 147. In another embodiment, an indicator is provided to the operator that the slope limits' as defined by Forestry guidelines for uphill and downhill operations, have been exceeded. In this case, the indicator is generated by the controller 202 to the display 228 to provide one of a visual or audible alarm.

The determined value for the wheel slip is compared to a threshold at block 318. If the determined value is greater that the threshold, the height of the grapple is maintained at its original position as determined at block 320. As the vehicle moves along the ground, the grapple is moved from its lowered position of block 310 occasionally to help the vehicle move forward. While moving forward on steep slopes or on loose soil, the grapple and logs are lowered to ground. This lowering provides a forward push to the machine to help it from being stuck or from rolling back. This movement is a manual movement controlled by the operator and is known as leapfrog motion.

In one or more embodiments, the determined wheel slip is stored in the memory 206 and transmitted to a server, through the antenna 127 for instance, for analysis. The wheel slip information is provided to one or more operators of other vehicles operating on the site to indicate that poor or improper soil conditions exist. Use of the same information, in other embodiments, is provided to operators for training or informational purposes to indicate that the site being worked produces more wheel slippage than other sites in the same region or locale.

The flow diagram 300 illustrates that for muddy or loose ground, that is detected based on wheel slip irrespective of slope conditions, the system automatically lowers the grapple 140. For solid ground when the terrain is flat, the grapple is automatically moved to a higher position to reduce the friction between the logs and the ground. Likewise, for solid ground, and a lesser slope, the grapple is automatically raised proportionally to the slope conditions. In addition, for solid ground where the slope is greater, the grapple is automatically lowered.

Different types of vehicles are affected differently by different slopes. For instance, the wheel slip of a wheeled skidder is greater than the slip of the tracks of a tracked skidder. For a tracked skidder, the slope values used to make the comparison at block 318 are slightly greater since the tracks tend to slip less than wheels at the same slope.

To determine whether a given output of the level sensor qualifies as being a favorable slope, either no slope or a low slope, an unfavorable slope, or a high slope, certain parameters are considered as follows: i) wheeled machine vs tracked machine; ii) normal tires vs high floatation tires; and iii) uphill or downhill movement of the vehicle. These parameters are considered since an output of the level sensor, in one or more embodiments, qualifies as a favorable slope when moving downhill, while the same output of the level sensor is considered to be unfavorable in uphill motion of the vehicles. Similarly, use of tracked machines and high floatation tires makes it more favorable to accomplish work for the same level sensor output when compared to a wheel machine having standard tires.

For example, in one embodiment of a wheeled skidder with a high floatation tire, a zero slope range is less than 4.5 degrees for both uphill and downhill operations, which is less than 10% of a slope where 100% is equivalent to a slope of 45 degrees. A low slope range while moving uphill is approximately 4.5 to 6.75 degrees or 10% to 15%. In contrast, a low slope range while moving downhill is approximately 4.5 to 11.25 degrees or 10% to 25%. A high slope range while moving uphill is approximately greater than 6.75 degrees or greater than 15%. A high slope range while moving downhill is greater than 11.25 degrees or greater than 25%. Other designations of slope ranges are contemplated based on the type of ground engaging traction device.

At block 322, the controller 202 compares the determined value of the slope identified at block 316 to a threshold value to determine whether the slope is favorable. If the slope is not favorable, then the grapple positioning at block 320 is maintained or lowered based on the slope. If however the slope is favorable, the grapple height is adjusted at block 324 based on the following relationship:

$$\text{grapple height} \propto \frac{Avg \cdot \text{length of logs}}{\text{machine slope} * \text{weight of logs}}$$

The grapple height is a function of, or is based on length of logs, machine slope, and weight of logs. To determine the height of the grapple, the processor uses the average length of the logs divided by the result of multiplying the machine slope by the weight of the logs. Consequently, while moving on steeper slopes or on muddy ground, the grapple is lowered automatically to utilize weight of logs as a support to climb up the hill, thereby improving stability.

By considering an exemplary skidder that is skidding felled pine trees having an average length of 80 feet, having an approximate total weight being lifted of 3000 pounds, and where the soil conditions are considered to be favorable, the following cases provide illustrations of the above described relationship.

In a first example, the skidder is moving uphill or downhill at a slope of less than 4.5 degrees. In this example, the skidder is moving in a zero-slope area. Hence, the grapple is to be lifted to a height as specified by the following equation.

$$\text{grapple height} \propto \frac{\text{log length}}{\text{lifted weight}}$$

$$\text{grapple height} = \frac{k * 80}{3000}$$

The value of k is constant for a given skidder model or type of skidder and varies with the size of skidder. In this example, the maximum height to which the grapple can be raised is 12 feet. If, for instance k is equal to 400 for the given skidder, the grapple height is equal to 10.66 feet. Please note that in this example, the grapple height is independent of slope. In contrast, consider that at a slope of 6.75 degrees uphill, the maximum height to which grapple shall be raised is about 8 feet for the given load. See the graph of FIG. 5. Similarly, at 11.25 degrees downhill, the maximum height to which grapple shall be raised is 8 feet for the given load. See the graph of FIG. 6.

Figure 5:
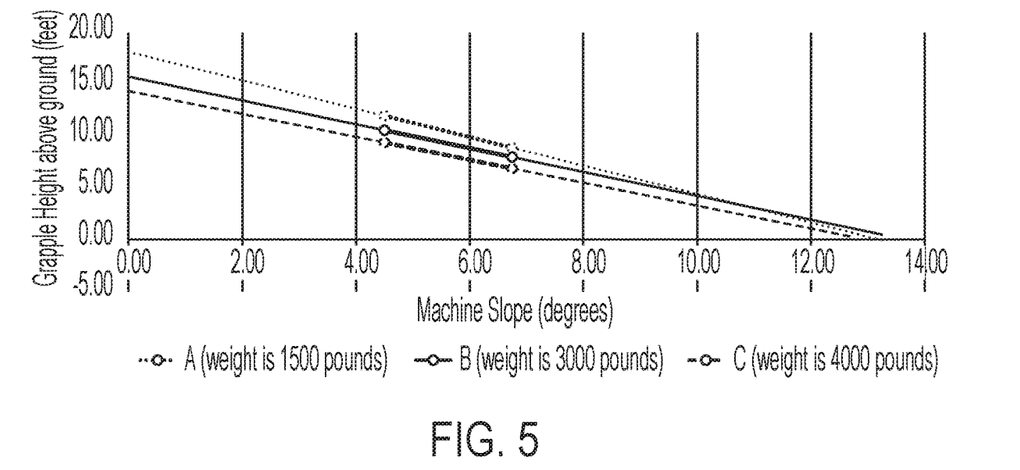
FIG. 5 is a graphical representation of grapple height versus machine slope for uphill motion.

In a second example, consider a skidder moving uphill in a low slope area. As seen in FIG. 5, considering the maximum grapple height at a slope of about 6.75 degrees, the grapple is raised to approximately 8.9 feet at 6 degrees.

In a third example, consider a skidder moving uphill in a high slope area. As seen in FIG. 5, considering the maximum grapple height at a slope of about 6.75 degrees, the grapple is raised to approximately 5.45 feet at 9 degrees.

Figure 6:
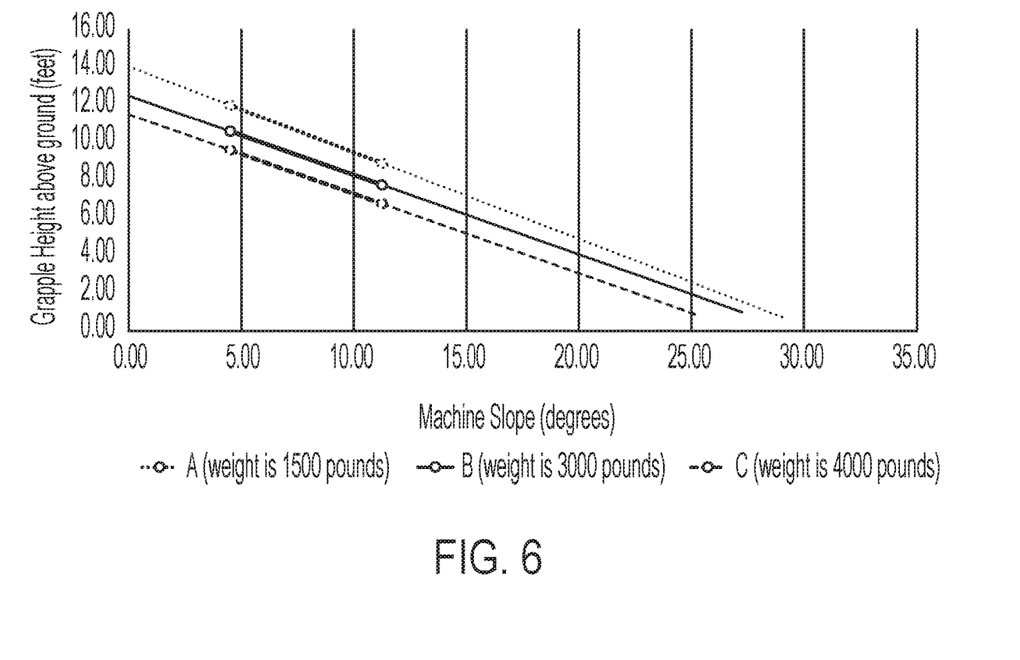
FIG. 6 is a graphical representation of grapple height versus machine slope for downhill motion.

In a fourth example, consider a skidder moving downhill in a low slope area. As seen in FIG. 6, considering the maximum grapple height at a slope of about 11.25 degrees, the grapple is raised to approximately 9.25 feet at 8 degrees.

In a fifth example, consider a skidder moving downhill in a high slope area. As seen in FIG. 6, considering the maximum grapple height at a slope of about 11.25 degrees, the grapple is raised to 6.55 feet at 15 degrees.

In these and other embodiments, when the ground is muddy or is considered to be loose, such as covered in a loose aggregate, the slope is not considered, and the grapple is lowered to provide increased friction between the logs and the ground surface to aid in vehicle traction. Intermittent raising a lowering of the grapple is necessary in some conditions to move the vehicle forward. On solid ground where the slope is zero or close to zero, the height of the grapple is raised based on the weight of the logs and the length of the logs. If the ground is solid, but the uphill or downhill slope is relatively shallow, the grapple height is raised based on the log weight, the log length, and the slope. If, however, the slope is steep, the grapple height is lowered to improve stability. In this condition, however, the grapple may be raised intermittently to move the machine in a forward direction using the leapfrog motion. In each of the slope conditions, the position of the grapple with respect to the ground determines the efficiency of the skidding operation and also the vehicle's stability.

Once the operator moves the logs to the desired location, the operator drops the logs using the squeeze selector or by either keeping the grapple at the same position or lowering the grapple depending on the current grapple height at block 326. After releasing the logs, the grapple is returned to a default position in response to the operation of the squeeze selector at block 328 and the operator returns to pick up a new group of logs. In the alternative, the operator manually adjusts the boom, the arch, and the grapple at block 328.

Before returning to collect a new group of logs, the operator unpresses or releases the auto carry selector at block 330.

The described embodiments, provide a number of advantages including: improving the stability of the skidder on sloped ground; improving the operational efficiency of the skidder by adjusting the grapple height; reducing the amount of time for the vehicle to complete harvesting of timber at a particular site; and reducing dependency on skilled operators through automation. Fuel efficiency is also improved under certain conditions. The operator is also provided with certain benefits including: reducing the complexity of a skidding operation and reducing operator fatigue.

While exemplary embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A work vehicle for moving felled trees along the ground that are cut from a worksite during a logging operation, the work vehicle comprising:
  a vehicle frame supported by wheels or tracks;
  a level sensor to provide a slope, the level sensor operatively connected to the vehicle frame to determine the slope of the vehicle with respect to the force of gravity;
  a grapple assembly mounted to the vehicle frame, the grapple assembly including a grapple to grasp the felled trees;
  a speed sensor to provide a wheel or track speed;
  a vehicle speed sensor to provide a vehicle speed; and
  a controller operatively connected to level sensor and to the grapple assembly, the controller including a processer and a memory, wherein the memory has a plurality of program instructions stored thereon, that in response to and execution of the plurality of program instructions by the processor causes the controller to:
    identify a slope of the vehicle with respect to the force of gravity based on the level sensor;
    actuate the grapple assembly to adjust a height of the grapple with respect to ground based on the identified slope;
  further wherein execution of the plurality of program instructions by the processor causes the controller to:
    identify a slip condition of the wheels or tracks based on the wheel or track speed and the vehicle speed;
    actuate the grapple assembly to adjust a height of the grapple with respect to ground based on the identified slip condition.

2. The work vehicle of claim 1 wherein the grapple assembly further includes an arch operatively connected to the frame and a boom operatively connected to the arch;
  wherein execution of the plurality of program instructions by the processor causes the controller to:
    actuate the grapple assembly to adjust the height of the grapple with respect to ground based on identified slope or the identified slip condition by adjusting a position of one or both of the arch and the boom.

3. The work vehicle of claim 2 further comprising a worksite data device operatively connected to the controller, wherein the worksite data device includes receives worksite data and is operatively connected to the controller, wherein execution of the plurality of program instructions by the processor causes the controller to:
  actuate the grapple assembly to adjust the height of the grapple with respect to ground based on the worksite data.

4. The work vehicle of claim 3 wherein the worksite data includes one or both of an average length of the felled trees and an average weight of the felled trees.

5. The work vehicle of claim 2 further comprising a user interface operatively connected to the controller, wherein the user interface includes a manual height selector and an automatic height selector, wherein execution of the plurality of program instructions by the processor causes the controller to:
  actuate the grapple assembly to automatically adjust the height of the grapple with respect to ground based on a state of the automatic height selector; and
  actuate the grapple assembly to adjust the height of the grapple with respect to ground bases on a state of the manual height selector.

6. The work vehicle of claim 1 further comprising a user interface operatively connected to the controller, wherein the user interface includes an automatic carry selector, wherein the controller in response to selection of the automatic carry selector and in response to execution of the plurality of program instructions by the processor causes the controller to:
  actuate the grapple assembly to adjust the grapple height and to close the grapple.

7. The work vehicle of claim 6 wherein the user interface includes an automatic lockout selector, wherein the controller in response to selection of the automatic lockout selector and in response to execution of the plurality of program instructions by the processor causes the controller to:
  actuate the grapple assembly to lower the grapple toward the ground and switch an engine of the vehicle to an off condition.

8. A control system of for moving felled trees that are cut from a worksite during a logging operation with a work vehicle having a vehicle frame supported by wheels or tracks and a grapple assembly mounted to the vehicle frame, the grapple assembly including a grapple to grasp the felled trees, the control system comprising:
  a level sensor to provide a slope, the level sensor operatively connected to the vehicle frame to determine the slope of the vehicle with respect to the force of gravity;
  a speed sensor to provide a wheel or track speed;
  a vehicle speed sensor to provide a vehicle speed; and
  a controller operatively connected to level sensor and to the grapple assembly, the controller including a processer and a memory, wherein the memory has a plurality of program instructions stored thereon, and execution of the plurality of program instructions by the processor causes the controller to:
    identify a slope of the vehicle with respect to the force of gravity based on the level sensor; and
    actuate the grapple assembly to adjust a height of the grapple with respect to ground based on the identified slope;
  further wherein execution of the plurality of program instructions by the processor causes the controller to:
    identify a slip condition based on the wheel or track speed and the vehicle speed;
    actuate the grapple assembly to adjust a height of the grapple with respect to ground based on the identified slip condition.

9. The control system of claim 8 wherein execution of the plurality of program instructions by the processor causes the controller to:
actuate the grapple assembly to adjust the height of the grapple with respect to ground based on identified slope or the identified slip condition by adjusting a position of one or both of an arch and a boom of the grapple assembly.

10. The control system of claim 9 further comprising a worksite data device operatively connected to the controller, wherein the worksite data device receives worksite data and is operatively connected to the controller, wherein execution of the plurality of program instructions by the processor causes the controller to:
actuate the grapple assembly to adjust the height of the grapple with respect to ground based on the worksite data.

11. The control system of claim 8 wherein the worksite data includes one or both of an average length of the felled trees and an average weight of the felled trees.

12. The control system of claim 11 further comprising a user interface operatively connected to the controller, wherein the user interface includes a manual height selector and an automatic height selector, wherein the execution of the plurality of program instructions by the processor causes the controller to:
actuate the grapple assembly to automatically adjust the height of the grapple with respect to ground based on a state of the automatic height selector; and
actuate the grapple assembly to adjust the height of the grapple with respect to ground based on a state of the manual height selector.

13. The control system of claim 12 wherein the user interface includes an automatic carry selector, wherein execution of the plurality of program instructions by the processor causes the controller to:
actuate the grapple assembly to raise the grapple and close the grapple.

14. The control system of claim 13 wherein the user interface includes an automatic lockout selector, wherein the controller in response to selection of the automatic lockout selector and in response execution of the plurality of program instructions by the processor causes the controller to:
actuate the grapple assembly to lower the grapple toward the ground and switch an engine of the vehicle to an off condition.

15. A method of adjusting a height of a grapple with respect to ground using a grapple assembly supported by a vehicle having wheels or tracks, wherein the grapple grasps felled trees that are cut from a worksite during a logging operation, the method comprising:
identifying a slope of the vehicle with respect to the force of gravity;
actuating the grapple assembly to adjust a height of the grapple based on the identified slope of the vehicle;
identifying a wheel or track slip condition of the wheel or track; and
actuating the grapple assembly to adjust a height of the grapple based on the identified slip condition of the vehicle.

16. The method of claim 15 wherein the actuating the grapple assembly to adjust a height of the grapple based on the identified slope of the vehicle further comprises actuating the grapple assembly to adjust a height of the grapple based on a determined weight and a determined length of the felled trees when the identified slope is zero.

17. The method of claim 15 wherein the actuating the grapple assembly to adjust a height of the grapple based on the identified slope of the vehicle further comprises actuating the grapple assembly to adjust a height of the grapple based on a determined weight of the felled trees, a determined length of the felled trees, and the slope when the identified slope is other than zero.

* * * * *